United States Patent [19]

Farr

[11] Patent Number: 5,231,848

[45] Date of Patent: Aug. 3, 1993

[54] REFRIGERATOR COLD CONTROL

[75] Inventor: James B. Farr, Ann Arbor, Mich.

[73] Assignee: Tecumseh Products Company, Tecumseh, Mich.

[21] Appl. No.: 755,045

[22] Filed: Sep. 5, 1991

[51] Int. Cl.[5] .................................. F25B 1/00
[52] U.S. Cl. ........................ 62/229; 62/230; 361/103
[58] Field of Search ............ 62/226, 227, 229, 228.1, 62/228.4, 228.3, 126, 129, 230; 361/22, 25, 103

[56] References Cited

U.S. PATENT DOCUMENTS

| | | | |
|---|---|---|---|
| 3,408,825 | 11/1962 | Watrous et al. | 62/226 X |
| 3,553,975 | 8/1962 | Sakamoto | 62/156 |
| 3,595,028 | 7/1971 | Schrader | 62/229 X |
| 4,006,603 | 2/1977 | Miles | 62/229 |
| 4,087,848 | 5/1978 | Hyink et al. | 361/103 |
| 4,187,093 | 2/1980 | Boratgis et al. | 62/126 |
| 4,325,225 | 4/1982 | Price, II | 62/229 |
| 4,380,155 | 4/1983 | Paddock et al. | 62/126 |
| 4,493,191 | 1/1985 | Hanson | 62/126 |
| 4,498,311 | 2/1985 | Sakano et al. | 62/227 |
| 4,819,441 | 4/1989 | Hanson | 62/160 |
| 4,903,498 | 2/1990 | Hanson | 62/126 |
| 4,903,502 | 2/1990 | Hanson et al. | 62/228 |
| 4,966,010 | 10/1990 | Jaster et al. | 62/179 |
| 5,086,626 | 2/1992 | Iida | 62/228.4 X |

Primary Examiner—Harry B. Tanner
Attorney, Agent, or Firm—Baker & Daniels

[57] ABSTRACT

The present invention is a cold control for refrigerators. The cold control circuit includes temperature sensitive resistances disposed within the cold box portion of the refrigerator. The cold control circuit senses the temperature of the cold box portion by a NTC thermistor which is disposed in the cold box portion and connected to the control circuit. When the temperature rises above the turn-on set point, the NTC thermistor has a relatively small resistance and activates a transistor. The transistor is connected to a latching circuit which maintains activation of the refrigerator until the thermistor falls below the turn-off point. Another solid state switch of the control circuit activates the refrigerator compressor, such as a transistor turning on an inverter in a DC powered refrigerator and a triac directly supplying current in an AC powered refrigerator. For battery powered refrigerators, the cold control includes a clipping circuit to prevent false activation or de-activation of the inverter caused by ripple voltages. The present invention provides the reliability of a solid state temperature sensor while avoiding the expense of a microprocessor driven system.

14 Claims, 2 Drawing Sheets

REFRIGERATOR COLD CONTROL

BACKGROUND OF THE INVENTION

1. Field of the Invention

The present invention relates to refrigerators. More particularly, the field of the invention is that of refrigerator control units for maintaining the internal refrigerator temperature.

2. Prior Art

Refrigerator control units generally include a thermostat that activates the refrigerator compressor when the internal refrigerator temperature rises above a set point. The thermostat also de-activates the compressor when the temperature falls below a second set point which may be different from the first set point. Conventional thermostats include mechanical parts which respond to temperature changes and activate an electrical switch.

For example, one conventional mechanical thermostat device includes a sealed tube in communication with a diaphragm connected to an electrical contact. Liquid alcohol or another temperature responsive volatile fluid is disposed in the tube and expands or contracts according to the ambient temperature, thus moving the electrical contact of the diaphragm and opening or closing the switch. With the tube disposed in thermal contact with the cold box or refrigerated portion of the refrigerator, typically the refrigerator evaporator, the thermostat switches on and off according to the cold box temperature.

Several problems may occur with such a conventional mechanical thermostat device. One problem is that the physically moving portion of the thermostat may be subject to wear which degrades the responsiveness of the thermostat. Also, the tube may become physically damaged from ordinary transportation or use of the refrigerator and disrupt the hermetically sealed environment inside the tube. Further, the cost of conventional mechanical thermostat devices is greater than the remainder of the thermostatic circuitry.

Another conventional mechanical thermostat device includes a bimetal element, such as a plate or disc. The inclination of the bimetal element varies according to the temperature and acts as a self-actuating switch when connected to one electrical contact and disposed in proximity to another electrical contact. The bimetal element bends, varying its incline sufficient to touch the unconnected contact and complete the circuit.

This conventional mechanical arrangement has similar problems with wear as the capillary tube, and also may suffer from metal fatigue and corrosion. In addition, the bending action of the bimetal element may need calibration, for example bias applied by a spring mechanism, to operate effectively. Requiring calibration adds to the cost of manufacture of the refrigerator, and may also lead to further expenses if the bimetal element is disturbed and requires further calibration.

An additional conventional thermostatic device is a solid state electrical circuit including a temperature responsive resistance element and a microprocessor control. The temperature responsive resistance element is typically disposed in a bridge circuit and attached to the microprocessor so that the microprocessor may determine the temperature of the cold box of the refrigerator and activate or de-activate the compressor according to its programming.

This conventional solid state electrical circuit has advantages over mechanical thermostatic devices in regards to reliability and durability. The physical device which responds to the temperature is much less subject to damage from wear, corrosion, metal fatigue, or other physically degrading conditions. Also, the solid state thermostatic circuit does not require mechanical calibration or servicing, and its temperature responsiveness is unlikely to change after manufacture. However, providing a microprocessor greatly increases the cost of the refrigerator cold control. Particularly in applications which require only an On/Off control, a microprocessor based cold control system is prohibitively expensive.

Other prior art temperature controls are known which include a thermistor which varies its resistance according to its temperature. The thermistor is connected in a circuit with a switching device, such as an operational amplifier with a regulating transistor or alternatively a Schmitt trigger circuit constructed from discrete components. An operational amplifier compares the voltage drop across the thermistor with a predetermined voltage to turn on its regulating transistor and thereby determine the On/Off set point of the cold control. The Schmitt trigger circuit switches when the voltage drop across the thermistor becomes sufficiently high to cause conduction which then activates a power relay to the refrigerator compressor.

For portable refrigerators which are driven by a direct current power source, the predetermined voltage is provided by a battery. However, the voltage supplied by the battery is also subject to ripple voltages caused by feedback from the inverter. These ripple voltages may falsely switch the switching device when the temperature of the thermistor has not significantly changed. Further, as the battery is drained, the ripple voltage fluctuations become more acute. Having the cold control fluctuate, and thereby successively turn the inverter on and off, subjects the inverter to undesirable starting and stopping which adversely effects the compressor that is driven by the inverter.

For refrigerators which are powered by direct current and those which are powered by alternating current, the difference between the On and Off set points is determined by the hysteresis of the switching device. A switching device with a hysteresis which is too small may be wasteful of energy because of the frequent cycling of the compressor. A switching device with a hysteresis which is too high may result in excessive cold box temperature variation. However, the difference between the On and Off set points is limited to a small percentage of the switching voltage of the switching device. Further, the hysteresis is determined by the inherent characteristics of the discrete comparator or Schmitt trigger circuit, and thus cannot easily be changed. Another discrete switching device may be substituted, but such a substitution may be difficult to accomplish and may also require additional changes in the associated circuitry. For portable refrigerators, the ripple voltages may overcome the inherent hysteresis of the switching device and cause the undesirable on and off cycling.

What is needed is a thermostatic device which is not as subject to wear as conventional mechanical thermostats.

Also needed is a thermostatic device which is less susceptible to physical degradation.

A further need is for a less costly thermostatic device.

Another need is for a thermostatic device which avoids successive activation and deactivation of the inverter and the compressor.

A still further need is for a thermostatic device which does not depend solely on the inherent hysteresis of the switching device to determine the On/Off set points.

SUMMARY OF THE INVENTION

The present invention is a refrigerator cold control having a thermistor for on/off control. The cold control provides the reliability and durability of electronic circuitry without requiring an expensive microprocessor. The cold control of the present invention includes a temperature responsive resistor disposed in the refrigerated cold box which switches the compressor on and off according to the ambient temperature of the cold box. The temperature responsive resistor is coupled with a latching circuit so that the latching circuit adds to the inherent hysteresis of the switching device. The latching circuit increases the difference between the On/Off set points allowing a greater and more easily adjusted On/Off range.

For portable refrigerators driven by batteries, the clipping circuitry provides reliable cold control switching in response to temperature change without significant interference from battery ripple voltages. This prevents undesirable on and off cycling of the compressor which may be caused when ripple voltages falsely switch the inverter on and off.

The latching circuit includes a voltage divider circuit which provides a calculable hysteresis voltage in addition to the inherent hysteresis of the switching device. The resistance of the voltage divider circuit ma by varied to set the hysteresis to a small or large value according to the needs of the particular application. In this manner, by substituting one or two resistors the difference between the On and Off set points may be readily adjusted.

The present invention, in one form, is a refrigerator comprising a housing, a compressor disposed within the housing, a refrigerated portion disposed within the housing, and a control device for activating and deactivating the compressor in response to the ambient temperature of the refrigerated portion. The control device includes a resistance device for sensing temperature and which has a resistance that varies according to the temperature. The control device also includes a first switching device for activating the compressor, with the resistance device disposed in the refrigerated portion and operably connected to the first switching device. The resistance device activates the first switching device to activate the compressor when the resistance device is at a temperature which exceeds a first predetermined set point. The control device further includes a latching device for latching the first switching device in response to the resistance device being at a temperature which exceeds a second predetermined set point. The latching device de-activates the first switching device when the resistance device is at a temperature which falls below the second set point.

One object of the present invention is to provide a thermostatic device which is not as subject to wear as conventional mechanical thermostats.

Also an object is to provide a thermostatic device which is less susceptible to physical degradation.

A further object is to provide a less costly thermostatic device.

Another object is to provide a thermostatic device which avoids successive activation and deactivation of the inverter and the compressor.

A still further object is to provide a thermostatic device which does not depend solely on the inherent hysteresis of the switching device to determine the On/Off set points.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 5:
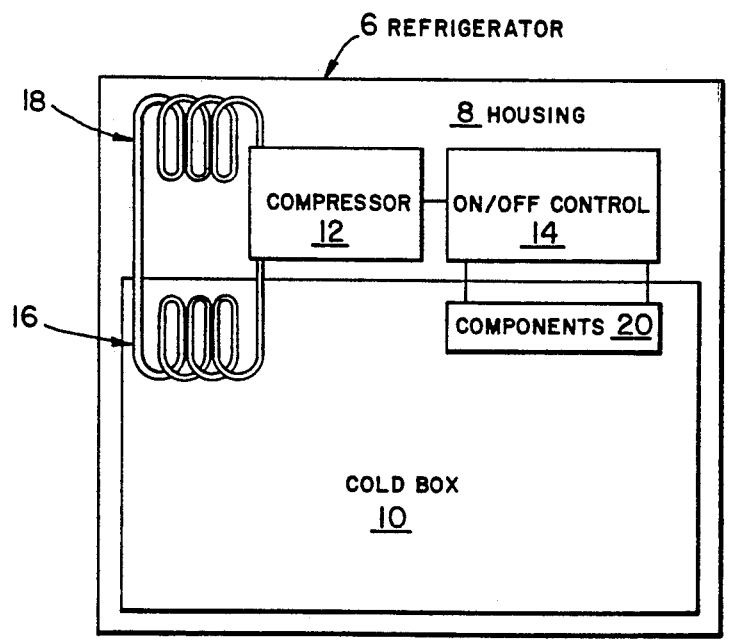
FIG. 5 is a schematic diagram of the refrigeration of the present invention.

The present invention relates generally to refrigerator cold controls such as the refrigerator system shown in FIG. 5. Refrigerator 6 has housing 8 which contains cold box 10, compressor 12, and on/off control 14. Evaporator coils 16 are disposed in cold box or refrigerated portion 10 and fluidly connected with compressor 12 for cooling the interior of cold box 10. Condenser coils 18 are disposed exteriorly of cold box 10, preferably outside of housing 8 but still in fluid communication with compressor 12. On/off control 14 activates and deactivates compressor 12 to provide cooling refrigerant fluid to refrigerator evaporator 16 for refrigerating cold box 10.

Temperature responsive circuit branch 20 is disposed in cold box 10 and electrically connected with on/off control 14. Circuit branch 20 includes resistive element R3 which has a negative temperature coefficient and includes transistor Q2 and diode D2 which have voltage thresholds which decrease with increasing temperature. In circuit branch 20, resistive element R3 is the predominant temperature control element. By the temperature of cold box 10 rising above the turn-on set point of refrigerator 6, the temperature of the resistive element in circuit branch 20 falls to a point at which a signal is sent to on/off switch 14 and activates inverter 24 which in turn provides power to compressor 12.

Figure 1:
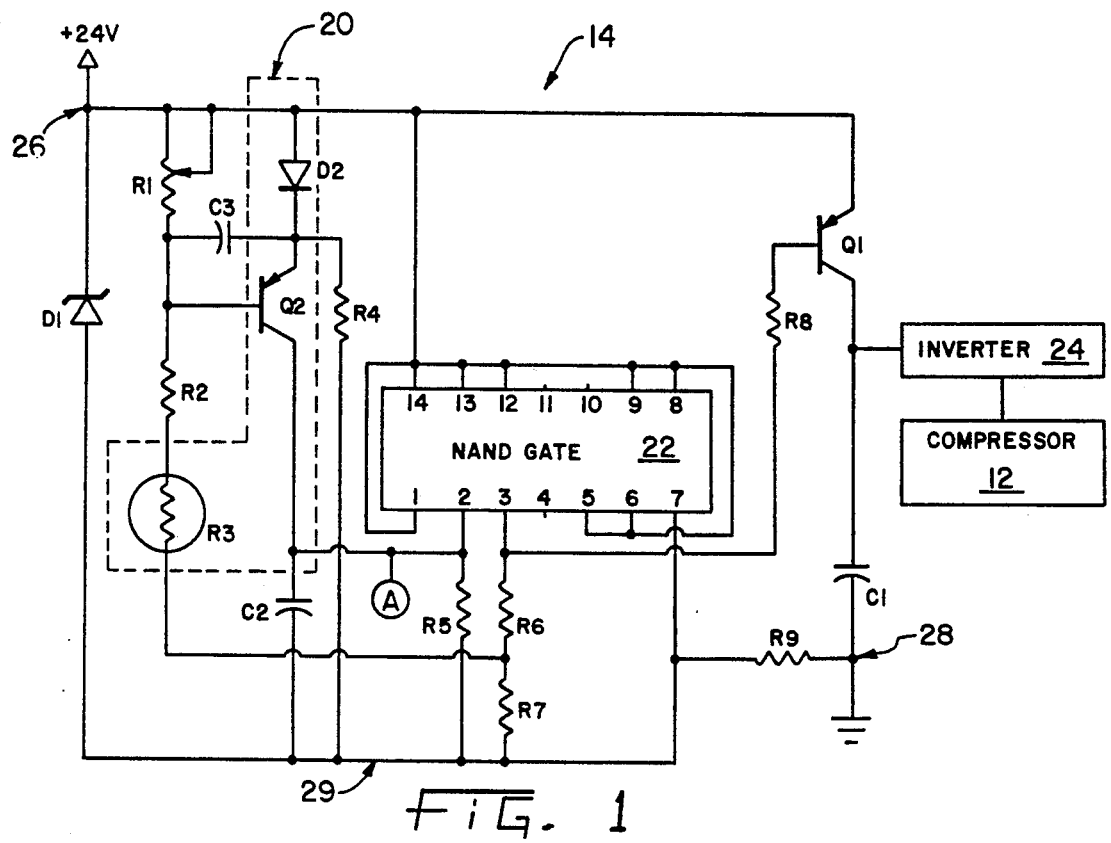
FIG. 1 is a schematic circuit diagram of the refrigerator cold control for an inverter driven refrigerator of the present invention.

FIG. 1 shows a schematic circuit diagram of on/off control 14 including circuit branch 20. The circuit of FIG. 1 includes resistors R1-R9, diodes D1-D2, transistors Q1-Q2, capacitors C1-C3, and NAND gate 22 which are interconnected to activate inverter 24. A positive twenty-four volt power source is indicated at positive node 26, and a ground connection is indicated at ground node 28. The setting of variable resistor together with circuit branch 20 determines the desired air temperature inside cold box 10. Negative temperature coefficient (NTC) resistor R3, transistor Q2, and diode D2 are disposed in cold box 10 are designated as circuit branch 20. NTC thermistor R3 is placed within cold box 10 to sense the internal air temperature. D2 and Q2 may be placed outside cold box 10, however, D2 and Q2 are temperature sensitive and when placed within cold box 10, complement the effect of thermistor R3. The circuitry of on/off control 14 which is disposed outside cold box 10 are often exposed to heat which would cause R2 and Q2 to interfere with the thermostatic response of R3. Therefore, D2 and Q2 are preferably disposed within cold box 10 with thermistor R3 in circuit branch 20.

Inverter 24 may be of the type disclosed in copending application "IMPROVED PROTECTION CIRCUIT INVERTER FOR REFRIGERATORS", U.S. Ser. No. 07/747,730, filed Aug. 20, 1991, which is a continuation-in-part of "INVERTER FOR PORTABLE REFRIGERATOR", U.S. Ser. No. 07/665,024, filed Mar. 5, 1991, both of which are assigned to the assignee of the present invention, the disclosures of which are explicitly incorporated by reference. Inverter 24 is drivingly coupled to compressor 12 and provides a shunted three phase electric current. Alternatively, a brushless direct current (BLDC) drive circuit may be used to provide power to compressor 12.

On/off control 14 incudes NAND gate 22 so that a single temperature responsive switching means is provided for activating and deactivating compressor 12. Positive node 26 is coupled to pins 1, 5, 6, 8, 9, 12, 13, and 14 of NAND gate 22 to bias those pins high. Pins 4, 10, and 11 of NAND gate 22 are unused output pins. Pin 7 of NAND gate 22 is coupled through resistor R9 to ground node 28 for grounding NAND gate 22. Pin 2 of NAND gate 22 is coupled to circuit branch 20 which provides an input signal to pin 2. Pin 3 of NAND gate 22 is coupled through resistor R8 to the base of transistor Q1 so that Q1 may be activated. Q1 is the power switch for the cold control and has an emitter coupled to positive node 26 and a collector coupled to inverter 24 so that when pin 3 of NAND gate 22 goes low, Q1 turns on and activates inverter 22 which then supplies power to compressor 12.

In accordance with one aspect of the present invention, the input at pin 2 of NAND gate 22 is determined by a latching circuit arrangement which includes variable resistor R1, NTC thermistor R3, resistors R2, R6, and R7, diode D2, and transistor Q2. This latching circuit arrangement provides an additional, calculable hysteresis to the inherent hysteresis of NAND gate 22. When NTC thermistor R3 is sufficiently cool and has an "off" resistance value, the voltage drop across the base-emitter of Q2 is insufficient to turn on transistor Q2. When thermistor R3 rises in temperature, and thereby has a reduced resistance, the voltage drop across the emitter-base of Q2 is sufficient to turn on Q2. Once Q2 is conductive and input pin 2 goes high, output pin 3 goes low and suddenly drops the voltage at the upper end of R7. To make Q2 non-conductive again, the resistance of R3 must increase in value by an amount such that the increase in the voltage across R3 equals the aforementioned sudden voltage drop at the upper end of R7. The higher the resistance of R7 is, the greater temperature change is required in R3 to switch transistor Q2. This arrangement of resistors R1, R2, and R7, thermistor R3, and transistor Q2 thereby latches Q2.

FIG. 1 shows the circuit diagram of the latching circuit arrangement and other portions of the cold control. Variable resistor R1 has one terminal connected to positive node 26 and the other terminal connected to one terminal of capacitor C3, the base of transmitter Q2, and one terminal of resistor R2. The anode of diode D2 is also connected to positive node 26 with the cathode of D2 being connected with one terminal of resistor R4, the other terminal of C3, and the emitter of transistor Q2. The other terminal of R2 is coupled to NTC thermistor R3 which is coupled in series with R7 then R9 to ground node 28. Resistor R6 is disposed between pin 3 of NAND gate 22 and R7. R6 forms a voltage divider circuit with R7 and has a much greater resistance than R7 which allows the large-magnitude step voltage changes at pin 3 of NAND gate 22 to create the desired amount of hysteresis in circuit branch 20. The collector of Q2 is connected to a terminal of capacitor C2, resistor R5, and pin of NAND gate 22. Capacitor C3 provides filtering to the emitter-base of Q2, while capacitor C2 provides further filtering to input pin 2 of NAND gate 22.

In accordance with another aspect of the present invention, Zener diode D1 and resistor R9 provide a clipping circuit to protect the cold control from ripple voltages. Zener D1 has a cathode coupled to positive node 26 and an anode coupled to ground node 28 through R9. Zener D1 clips any ripple voltages appearing between positive node 26 and ground node 28, particularly during operation of inverter 24, thereby providing a smooth voltage between node 26 and node 29. Also, Zener D1 regulates the voltage across the series circuit of R1, R2, R3, and R7. Capacitor C1 is coupled between the collector of Q1 and ground node 28 and acts as a filter for input to inverter 24.

In operation, when the temperature within cold box 10 is above the turn-on set point, thermistor R3 has a relatively low resistance and thus causes a sufficient voltage drop across the emitter-base of Q2 to turn Q2 on. Once Q2 is conducting, the voltage apparent at pin 2 of NAND gate 22 rises above the trip threshold of NAND gate 22 and quickly causes output pin 3 of NAND gate 22 to drop to a low voltage. The low voltage apparent at pin 3 of NAND gate 22 causes Q1 to conduct which activates inverter 24. Thus, Q2 is latched fully on because the voltage at R7 is greatly decreased, causing greater current flow through R3, R2, R1, and the emitter-base junction of Q2.

When the temperature within cold box 10 falls below the turn-off set point, the resistance of thermistor R3 rises to such a value that Q2 ceases to conduct. This drops pin 2 of NAND gate 22 below its trip threshold and causes pin 3 of NAND gate 22 to rise to a high voltage. The high voltage apparent at pin 3 turns off Q1 and terminates operation of inverter 24 and compressor 12.

The difference between the turn-on set point and the turn-off set point temperatures is determined primarily by the value of R7. In effect, the hysteresis of the circuit including the emitter-base of Q2 in series with R2, R3, and R7 supplements the hysteresis of NAND gate 22. Therefore, the greater the resistance of R7, the greater the hysteresis that is established for resistance values of R3 and the greater the temperature differential between the turn-on set point and the turn-off set point.

Figure 2:
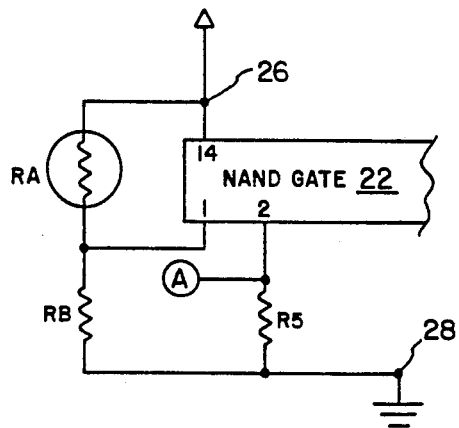
FIG. 2 is a schematic circuit diagram of a motor high temperature protection circuit.
Figure 3:
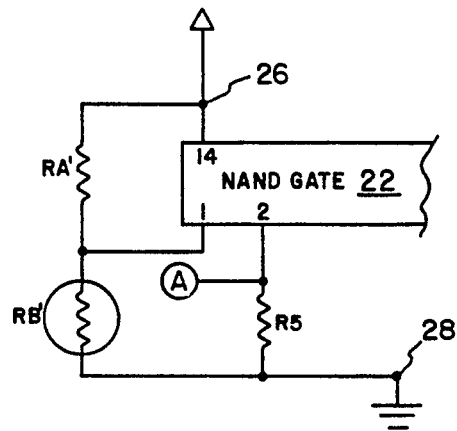
FIG. 3 is a schematic circuit diagram of a second embodiment of a motor high temperature protection circuit.

A thermal protection circuit may be provided to the associated inverter or brushless D.C. motor drive circuit by either of the circuits shown in FIGS. 2 and 3. In FIG. 2, positive temperature coefficient (PTC) thermistor RA has one terminal coupled to positive node 26 and pin 14 of NAND gate 22, and has the other terminal coupled to pin 1 of NAND gate 22 and to node 29 through resistor RB. RA is placed in thermal contact with the inverter or BLDC drive circuit so that if the drive circuit becomes excessively hot, PTC thermistor RA will increase its resistance so that a low voltage is apparent at pin 1. When pin 1 goes low, output pin 3 of NAND gate 22 will go high and turn off Q1, thus deactivating the power circuit.

Similarly in FIG. 3, negative temperature coefficient (NTC) thermistor RB' has one terminal coupled to node 29 and pin 1 of NAND gate 22, and has the other terminal coupled to positive node 26 through resistor RA'. RB' is placed in thermal contact with the inverter or BLDC drive circuit so that if the drive circuit becomes excessively hot, NTC thermistor RB' will decrease its resistance so that a low voltage is apparent at pin 1. When pin 1 goes low, output pin 3 of NAND gate 22 will go high and turn off Q1, thus deactivating the power circuit.

Figure 4:
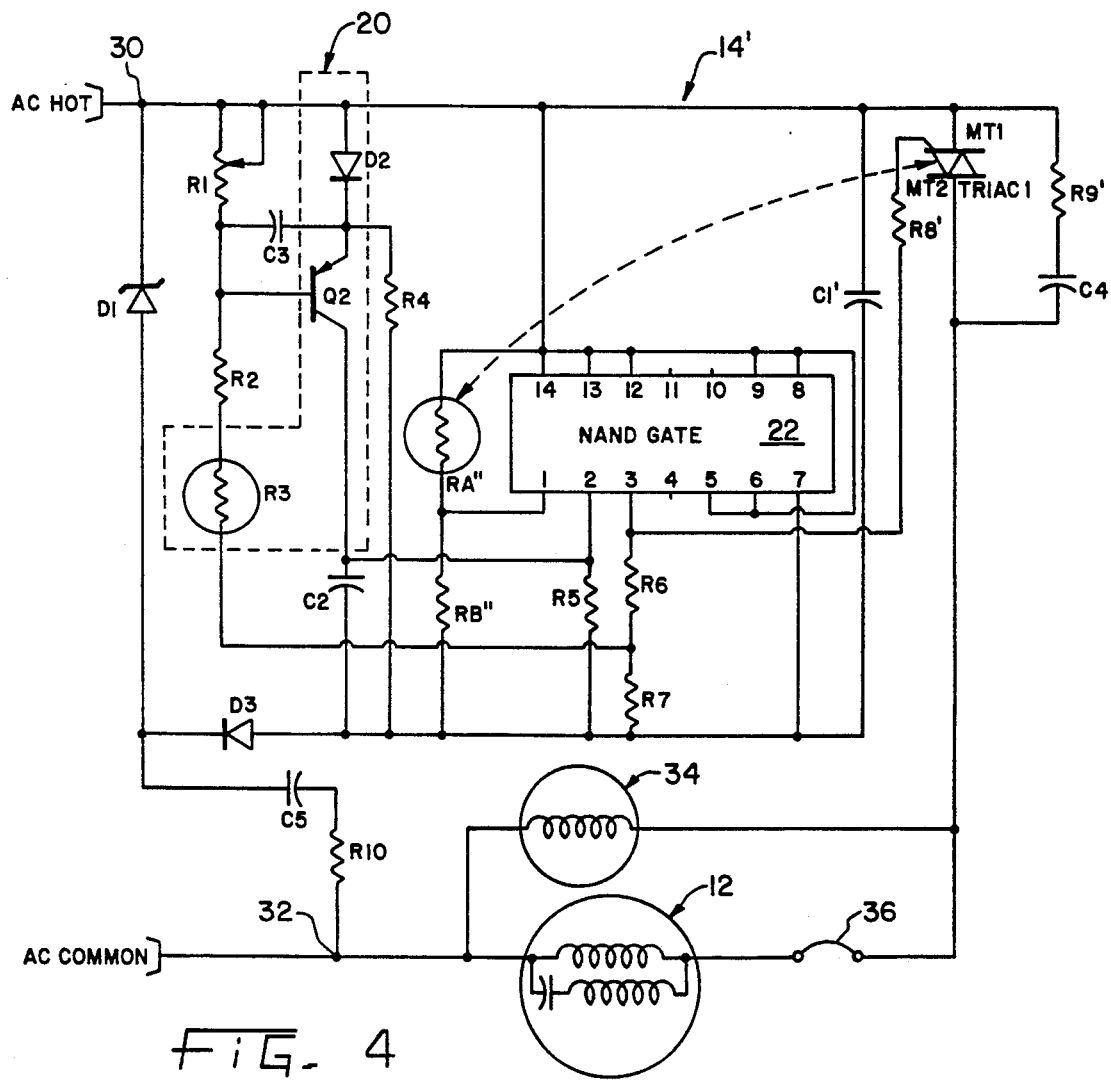
FIG. 4 is a schematic circuit diagram of the refrigerator cold control for an alternating current driven refrigerator of the present invention.

A second embodiment of the refrigerator cold control of the present invention used with a refrigerator running on AC current is shown in FIG. 4. This AC embodiment is similar to the embodiment of FIG. 1 and is modified to connect compressor 12 with an AC power source. One difference between the DC and AC circuits is that the switching means for activating compressor 12 is TRIAC1 in FIG. 4 rather than Q1 in FIG. 1.

FIG. 4 shows a schematic circuit diagram of on/off control 14' adapted for use with AC power and including circuit branch 20. The circuit of FIG. 4 includes resistors R1-R10, diodes D1-D2, transistor Q2, capacitors C1', C2-C5, triac TRIAC1, and NAND gate 22 which are interconnected to activate compressor 12. A hot alternating current (AC) power source is indicated at power line 30, and an AC common return is indicated at return line 32. Negative temperature coefficient (NTC) resistor R3, transistor Q2, and diode D2 are disposed in cold box 10 as part of circuit branch 20. NTC thermistor R3 is placed within cold box 10 to sense the internal air temperature. D2 and Q2 may be placed outside cold box 10; however, D2 and Q2 are temperature sensitive and, when placed within cold box 10, effect the negative resistance change of thermistor R3.

Power lines 30 and 32 provide a CD source by operation of conversion circuitry including Zener diode D1, capacitors C1' and C5, diode D3, and resistor R10. This arrangement of conversion circuitry is similar to a circuitry arrangement disclosed in U.S. patent application Ser. No. 07/618,164, entitled "LIQUID LEVEL CONTROL WITH CAPACITIVE SENSORS", filed Nov. 26, 1990, now U.S. Pat. No. 5,145,323 assigned to the assignee of the present invention, the disclosure of which is explicitly incorporated by reference.

On/off control 14' includes circuit branch 20, NAND gate 22, and TRIAC1 so that a single temperature responsive switching means is provided for activating and deactivating compressor 12. Power line 30 is coupled to pins 5, 6, 8, 9, 12, 13, and 14 of NAND gate 22. Pins 4, 10, and 11 of NAND gate 22 are unused outputs of the quad 2-input NAND Schmitt trigger. Pin 7 of NAND gate 22 is coupled to the anode of diode D3 and to one terminal of C1'. Pin 2 of NAND gate 22 is coupled to circuit branch 20 which provides an input signal to pin 2. Pin 3 of NAND gate 22 is coupled through resistor R8' to the gate of TRIAC1 so that TRIAC1 may be activated. TRIAC1 is the power switch for the cold control and has main terminal 1 (MT1) coupled to power line 30 and main terminal 2 (MT2) coupled to compressor 12 and fan 34 so that when pin 3 of NAND gate 22 goes low, TRIAC1 turns on and activates compressor 12. Further, the series circuit including TRIAC1 and compressor 12 is parallel to the conversion circuitry mentioned above and therefore TRIAC1 may provide pure alternating current to compressor 12.

The input at pin 2 of NAND gate 22 is determined by a latching circuit arrangement which includes variable resistor R1, NTC thermistor R3, resistors R2, R6, and R7, diode D2, and transistor Q2. This latching circuit arrangement operates similarly to the arrangement described above in connection with the circuitry of FIG. 1. Variable resistor R1 has one terminal connected to power line 30 and the other terminal connected to one terminal of capacitor C3, the base of transmitter Q2, and one terminal of resistor R2. The anode of diode D2 is also connected to power line 30 with the cathode of D2 being connected with one terminal of resistor R4 and the emitter of transistor Q2. The other terminal of R2 is coupled to NTC thermistor R3 which is coupled in series with R7 then to the anode of diode D3. The cathode of Dc is coupled in series with capacitor C5 and resistor R10 to return line 32. Resistor R6 is disposed between pin 3 of NAND gate 22 and R7. R6 forms a voltage divider circuit with R7 and has a much greater resistance than R7 as is required to obtain the desired amount of hysteresis in the turn on/turn off temperatures. The collector of Q2 is connected to one terminal of capacitor C2, resistor R5, and pin 2 of NAND gate 22. Capacitor C2 is coupled between the collector Q2 and the anode of D3. Capacitor C3 provides filtering to the emitter-base of Q2, while capacitor C2 provides filtering to input pin 2 of NAND gate 22.

Other components of on/off control 14' shown in FIG. 4 are Zener diode D1, resistors R6 and R9', capacitors C1' and C4, and motor protector 36. Zener D1 has a cathode coupled to line 30 and an anode coupled to the junction of D3 and C5. Zener D1 regulates the voltage across capacitor C1'. Resistor R9' and capacitor C4 are coupled in parallel with TRIAC1 as a snubber network for voltage applied across TRIAC1. Motor protector 36 may be an overcurrent protector such as a bimetallic snap disc or the like.

The setting of variable resistor R1 determines the desired temperature inside cold box 10 and inherently determines a turn-on temperature set point and a turn-off temperature set point. When the ambient temperature of cold box 10 is above the turn-on set point, thermistor R3 has a relatively low resistance and thus causes a sufficient voltage drop across the emitter-base of Q2 to turn Q2 on. Once Q2 is conducting, the voltage apparent at pin 2 of NAND gate 22 rises above the trip threshold of NAND gate 22 and causes output pin 3 of NAND gate 22 to drop to a low voltage. The low voltage apparent at pin 3 of NAND gate 22 causes TRIAC1 to conduct which activates compressor 12. Also, fan 36 may be activated to blow air over condenser coils 16 or evaporator coils 18. Further, the low voltage at pin 3 of NAND gate 22 causes Q2 to latch on by virtue of the coupling of pin 3 with resistor R7.

When the ambient temperature of cold box 10 falls below the turn-off set point, the resistance of thermistor R3 rises to such a value that Q2 ceases to conduct. This drops pin 2 of NAND gate 22 below its trip threshold and causes pin 3 of NAND gate 22 to rise to a high voltage. The high voltage apparent at pin 3 turns off TRIAC1 at the next zero crossing of the AC current and terminates operation of compressor 12.

The difference between the turn-on set point and the turn-off set point temperatures is determined by the value of R7 as described above in regards to the embodiment of FIG. 1.

A protection circuit is provided to the circuitry of FIG. 4 by positive temperature coefficient (PTC) thermistor RA" and resistor RB". RA" has one terminal coupled to power line 30, and has the other terminal coupled to pin 1 of NAND gate 22 and to the anode of D3 through resistor RB" RA" is placed in thermal contact with TRIAC1 so that if TRIAC1 becomes excessively hot, PTC thermistor RA" will increase its resistance so that a low voltage is apparent at pin 1. When pin 1 goes low, output pin 3 of NAND gate 22 will go high and turn off TRIAC1 at the next zero crossing, thus protecting TRIAC1 against further heating.

With either embodiment of the present invention, all the components on/off control 14 may be disposed in cold box 10. Alternatively, all of on/off control 14 may be disposed in cold box 10 except for variable resistor R1. Other arrangements of the circuitry of on/off control 14 within cold box 10 and housing 8 may be used according to manufacturing costs or other factors.

The present invention may be practiced by using the following values for the circuit elements described above:

| Label | Value |
| --- | --- |
| R1 | 50.0 KΩ trim potentiometer |
| R2 | 1.0 KΩ |
| R3 | 50.0 KΩ @ 25° C. NTC thermistor |
| R4 | 100.0 KΩ |
| R5 | 33.0 KΩ |
| R6 | 33.0 KΩ |
| R7 | 0-1.0 KΩ selectable |
| R8 | 10.0 KΩ |
| R8' | 470.0 Ω @ 25° C. PTC thermistor |
| R9 | 10.0 KΩ |
| R9' | 820.0 Ω |
| R10 | 22.0 Ω |
| RA | 50.0 Ω @ 25° C. PTC thermistor |
| RB | 22.0 KΩ |
| RA' | 10.0 KΩ |
| RB' | 100.0 KΩ @ 25° C. NTC thermistor |
| RA" | 50.0 Ω @ 25° C. PTC thermistor |
| RB" | 22.0 KΩ |
| C1 | 1.0 μf |
| C1' | 470.0 μf |
| C2 | 0.1 μf |
| C3 | 0.1 μf |
| C4 | 0.1 μf |
| C5 | 0.68 μf |
| D1 | 6.2 V, 1 w Zener, 1N4735 |
| D2 | 1N4148 |
| D3 | 1N4001 |
| Q1 | 2N4403 |
| Q2 | MPS4126 |
| TRIAC1 | MAC228-6FP |
| NAND gate 22 | Quad 2-input NAND Schmitt Trigger, CD4093B |

It should be understood that the signals generated by the circuitry of the present invention may take many forms, such as voltage levels as disclosed, logic levels, polarity, current levels, etc.

While this invention has been described as having a preferred design, the present invention can be further modified within the spirit and scope of this disclosure. This application is therefore intended to cover any variations, uses, or adaptations of the invention using its general principles Further, this application is intended to cover such departures from the present disclosure as come within known or customary practice in the art to which this invention pertains and which fall within the limits of the appended claims.

What is claimed is:

1. A refrigerator comprising:
   a housing;
   a compressor disposed within said housing;
   a refrigerated portion disposed within said housing; and
   control means for activating and deactivating said compressor in response to the ambient temperature of said refrigerated portion, said control means including temperature responsive means for sensing temperature, said temperature responsive means having resistance means which varies according to the temperature and first switching means operably connected to said resistance means for activating said compressor, said temperature responsive means disposed in said refrigerated portion, said resistance means activating said first switching means to activate said compressor when said resistance means is at a temperature which exceeds a first predetermined set point, said control means further including latching means for latching said first switching means in response to said resistance means being at a temperature which exceeds a second predetermined set point, maintaining activation of said first switching means until said resistance means indicates a temperature below said second predetermined set point, and de-activating said first switching means when said resistance means is at a temperature which falls below said second predetermined set point.

2. The refrigerator of claim 1 wherein said control means further includes a temperature limiting means for deactivating said compressor when the sensed temperature of said compressor exceeds a predetermined level, said temperature limiting means disposed in thermal contact with said compressor and being operatively coupled to said first switching means.

3. The refrigerator of claim 1 further comprising an inverter drivingly coupled to said compressor and a power switch means for activating said inverter, said inverter being adapted to operate in connection with a source of direct current, and said power switch means being operatively coupled to said first switching means and said inverter for activating and de-activating said inverter.

4. The refrigerator of claim 1 further comprising power switch means for activating said compressor, said power switch means being drivingly coupled to said compressor, said power switch means being adapted to be connected with an alternating current source, and said first switching means being operably coupled to said power switch means to directly activate and de-activate said compressor.

5. The refrigerator of claim 4 further comprising temperature limiting means for preventing overheating of said power switch means, said temperature limiting means being thermally connected with said power switch means and operably coupled to said control means whereby when the temperature of said power switch means exceeds a predetermined temperature, said control means de-activates said power switch means.

6. The refrigerator of claim 5 wherein said power switch means includes a triac.

7. The refrigerator of claim 1 wherein said resistance means includes a negative temperature coefficient thermistor.

8. The refrigerator of claim 1 wherein said control means includes a logic gate, said resistance means operably coupled as an input to said logic gate.

9. The refrigerator of claim 8 wherein said control means includes power supply means for supplying power to said compressor, and said refrigerator further comprising means for de-activating said compressor when ambient temperature of said power supply means exceeds a predetermined value, said de-activating means operably coupled as a second input to said logic gate.

10. The refrigerator of claim 1 further comprising voltage regulating means coupled to said control means, said voltage regulating means for providing a regulated voltage to said resistance means.

11. A refrigerator adapted for battery powered operation, said refrigerator comprising:
a housing;
a compressor disposed within said housing;
an inverter means for supplying power to said compressor, said inverter means being adapted to be operably connected to a battery;
a refrigerated portion disposed within said housing; and
a control circuit for activating and deactivating said compressor in response to the ambient temperature of said refrigerated portion, said control circuit including temperature responsive means for sensing temperature, said temperature responsive means having resistance means which varies according to the temperature and first switching means operably connected to said resistance means for activating said inverter means, said temperature responsive means disposed in said refrigerated portion, said control circuit including second switching means for providing a signal for activating said switching means to activate said inverter means when said resistance means is at a temperature which exceeds a first predetermined set point, said control circuit causing said second switching means to de-activate said signal to said inverter means when said thermistor is at a temperature which falls below a second set point, said control circuit further including clipping means connected to said inverter and said control circuit for protecting against variations in said signal caused by ripple voltages during operation of said inverter means.

12. The refrigerator of claim 11 wherein said resistance means includes a negative temperature coefficient thermistor.

13. The refrigerator of claim 11 wherein said control circuit includes a logic gate, said resistance means providing an input to said logic gate.

14. The refrigerator of claim 13 further comprising means for de-activating said compressor when ambient temperature of said inverter means exceeds a predetermined value, said de-activating means providing a second input to said logic gate.

* * * * *